United States Patent
Wojtkowski, Jr. et al.

(10) Patent No.: US 10,006,486 B2
(45) Date of Patent: Jun. 26, 2018

(54) SPHERICAL OIL FILM BEARING

(71) Applicant: Primetals Technologies USA LLC, Alpharetta, GA (US)

(72) Inventors: Thomas C. Wojtkowski, Jr., Sutton, MA (US); Peter N. Osgood, Westborough, MA (US)

(73) Assignee: PRIMETALS TECHNOLOGIES USA LLC, Alpharetta, GA (US)

( * ) Notice: Subject to any disclaimer, the term of this patent is extended or adjusted under 35 U.S.C. 154(b) by 0 days. days.

(21) Appl. No.: 14/944,720

(22) Filed: Nov. 18, 2015

(65) Prior Publication Data
US 2016/0258483 A1  Sep. 8, 2016

Related U.S. Application Data

(60) Provisional application No. 62/128,648, filed on Mar. 5, 2015.

(51) Int. Cl.
*F16C 23/04* (2006.01)
*B21B 31/07* (2006.01)

(52) U.S. Cl.
CPC .......... *F16C 23/046* (2013.01); *B21B 31/074* (2013.01)

(58) Field of Classification Search
CPC ...... F16C 11/068; F16C 13/06; F16C 17/105; F16C 23/043; F16C 23/045; F16C 23/046; B21B 31/074
See application file for complete search history.

(56) References Cited

U.S. PATENT DOCUMENTS

| | | | |
|---|---|---|---|
| 2,219,669 | A | 10/1940 | Wallgren |
| 2,312,648 | A | 3/1943 | Jones |
| 3,379,464 | A | 4/1968 | Bradshaw |
| 3,613,428 | A | 10/1971 | Townsend et al. |
| 3,775,997 | A | 12/1973 | Carman |
| 4,026,572 | A | 5/1977 | Yoshioka |
| 4,111,499 | A | 9/1978 | McCloskey |
| 4,293,988 | A | 10/1981 | Biondetti |
| 4,319,522 | A | 3/1982 | Marchioro et al. |
| 4,480,452 | A | 11/1984 | Schnyder |

(Continued)

FOREIGN PATENT DOCUMENTS

| | | | |
|---|---|---|---|
| DE | 102007039858 | * | 3/2008 |
| EP | 1331411 A1 | | 7/2003 |

OTHER PUBLICATIONS

International Search Report & Written Opinion dated May 24, 2016 in connection with related International patent application No. PCT/US2016/018876, 11 pages.

(Continued)

*Primary Examiner* — James Pilkington
(74) *Attorney, Agent, or Firm* — Gesmer Updegrove LLP

(57) ABSTRACT

An oil film bearing for rotatably supporting a roll in a rolling mill is provide that includes a sleeve having an internal bore and an external spherical surface, the internal bore being configured and dimensioned for axial insertion onto a neck of the roll. A bushing includes an internal spherical surface configured and dimensioned to surround and rotatably contain the external spherical surface of the sleeve, the bushing being subdivided into multiple interconnected segments. A chock for containing and radially supporting the interconnected bushing segments.

13 Claims, 10 Drawing Sheets

(56) References Cited

U.S. PATENT DOCUMENTS

| | | | |
|---|---|---|---|
| 4,658,621 A | | 4/1987 | Link et al. |
| 5,000,584 A | * | 3/1991 | Simmons .............. B21B 31/074 384/114 |
| 6,123,461 A | | 9/2000 | Wojtkowski, Jr. |
| 6,468,194 B2 | | 10/2002 | Wojtkowski, Jr. et al. |
| 2006/0120644 A1 | | 6/2006 | Smith |
| 2009/0097787 A1 | | 4/2009 | Richard et al. |

OTHER PUBLICATIONS

International Preliminary Report on Patentability dated Sep. 14, 2017 in connection with related International Application No. PCT/US2016/018876.

\* cited by examiner

SPHERICAL OIL FILM BEARING

PRIORITY

This application claims priority to U.S. Provisional Application Ser. No. 62/128,648, filed on Mar. 5, 2015, which is incorporated herein by reference in its entirety.

BACKGROUND

1. Field

Embodiments of the present invention relate generally to oil film bearings designed to rotatably support the roll necks of rolls in a rolling mill, and are concerned in particular with spherical oil film bearings useful primarily although not exclusively in rotatably supporting the tapered roll necks of back-up rolls in mills producing flat products.

2. Description of Related Art

Rolling mills producing flat products generate extremely large forces which highly load the structural components of the mill stands. These highly loaded components undergo large deflections that must be accommodated. As shown diagrammatically in FIG. 1, of particular significance is the deflection of the back-up rolls 10 which provide support for the work rolls 12. The roll necks of the back-up rolls are typically supported in oil film bearings 14 of the type disclosed for example in U.S. Pat. No. 6,123,461 (Wojtkowski) and U.S. Pat. No. 6,468,194 (Wojtkowski et al.), the descriptions of which are herein incorporated by reference in their entirety. The bearings are contained in housings 16 commonly referred to as "chocks."

To compensate for roll deflection, the chocks 16 must be able to tilt so that the oil film bearings 14 can remain aligned with the roll ends.

The current design practice is to allow the chocks to tilt by employing rocker plates 18 for the chocks of the bottom back-up rolls, and curved seats 20 for the chocks of the top back-up rolls. However, the rocker plates and curved seats are subject to wear leading to failure, causing problems that affect both the bearings 14 and the ability of the mill to roll precision products.

In an earlier effort at addressing this problem, and as disclosed in U.S. Pat. No. 2,312,648 (Jones), it has been proposed to replace the conventional oil film bearings with spherical oil film bearings. With reference to FIG. 2, it will be seen that spherical oil film bearings 22 are capable of accommodating roll deflection within the confines of their respective chocks 24, thus eliminating the need to resort to chock tilting by employing associated rocker plates and curved seats. Elimination of these components simplifies mill design, increases mill stiffness and reduces the total height of the roll stack.

Notwithstanding the potential advantages of employing spherical oil film bearings in highly stressed rolling mills, and despite its debut over seventy years ago with the issuance of the Jones patent, it appears that this technology has never been employed in heavily loaded rolling mill applications. A number of drawbacks have contributed to this delay, including, to name a few, a discontinuous internal spherical bearing surface provided by separated multiple bushing components which are urged apart against internal chock surfaces, making them difficult to assemble and maintain in alignment within required tolerances when subjected to rolling forces.

Other drawbacks include inadequate lubrication at the bushing/sleeve interface, and excessive length of the bearing.

SUMMARY

Broadly stated, embodiments of the present invention are directed to the provision of a novel and improved spherical bearing which largely eliminates the drawbacks noted above.

An exemplary embodiment of an oil film bearing in accordance with the present invention for rotatably supporting a roll in a rolling mill comprises a sleeve having an internal bore and an external spherical surface. The internal bore is configured and dimensioned for axial insertion onto a neck of the roll.

A bushing has an internal spherical surface configured and dimensioned to surround and rotatably contain the external spherical surface of the sleeve. The bushing is subdivided into multiple interconnected segments, and a chock contains and radially supports the interconnected bushing segments.

The sleeve and the interconnected bushing segments may comprise an integral assembly receivable as a unit in the chock.

The bushing may be subdivided into two segments.

The internal spherical surface of the bushing is preferably substantially continuous.

The bushing segments may be interconnected by tensioned fasteners.

A means may be provided for supplying liquid lubricant to the interface between the external and internal spherical bearing surfaces.

The means for supplying liquid lubricant may comprise a network of passages in the chock and the bushing communicating with elliptically rebored first pads in the bearing's internal spherical surface at a location outside of a load zone of the bearing.

The means for supplying a liquid lubricant may further comprise a second network of passages in the chock and the bushing communicating with elliptically rebored second pads in the bearing's internal spherical surface at a location within the bearing load zone.

DETAILED DESCRIPTION

Figure 1:
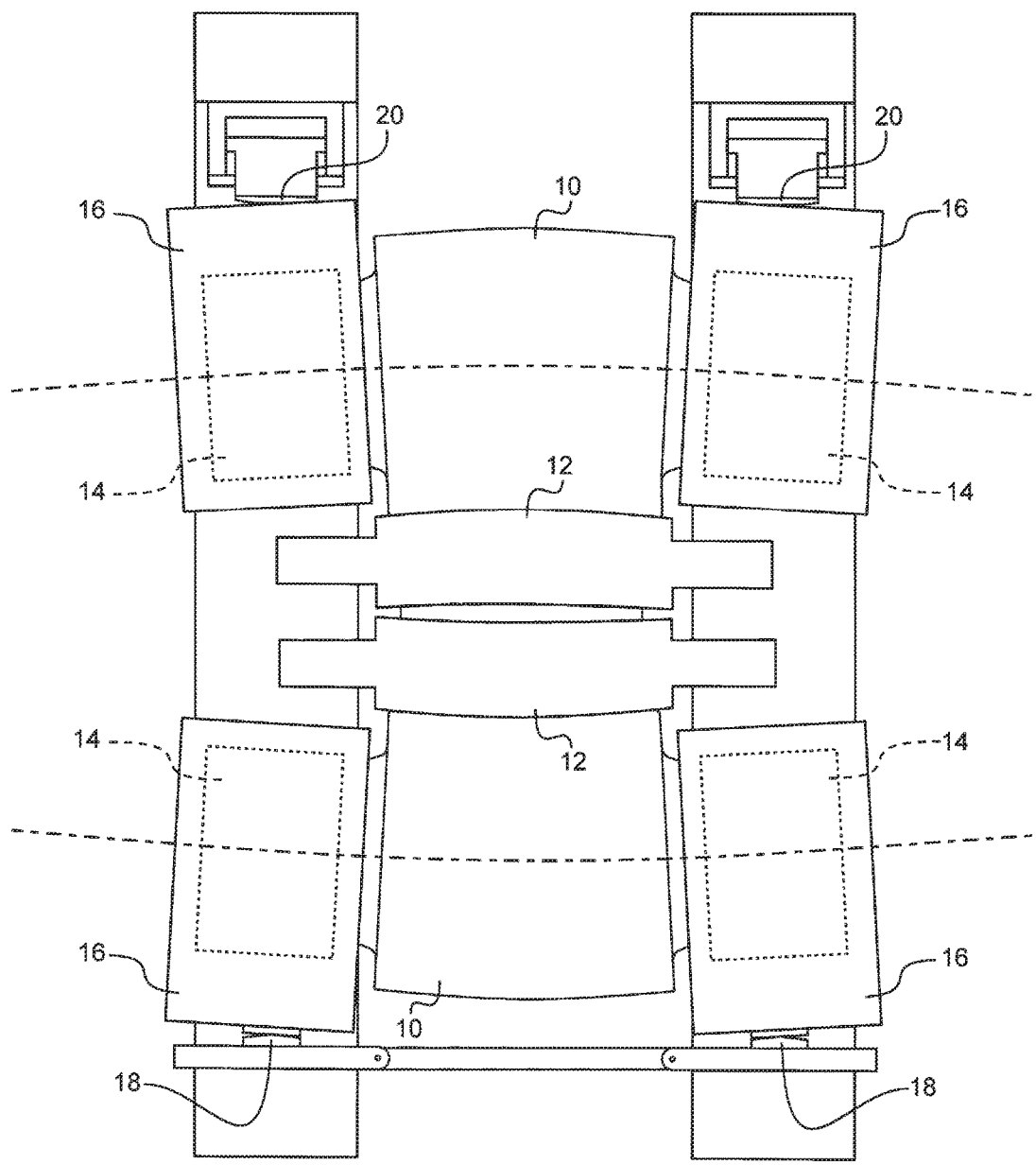
FIG. 1 is a diagrammatic illustration of a roll stand equipped with conventional oil film bearings and chocks.
Figure 2:
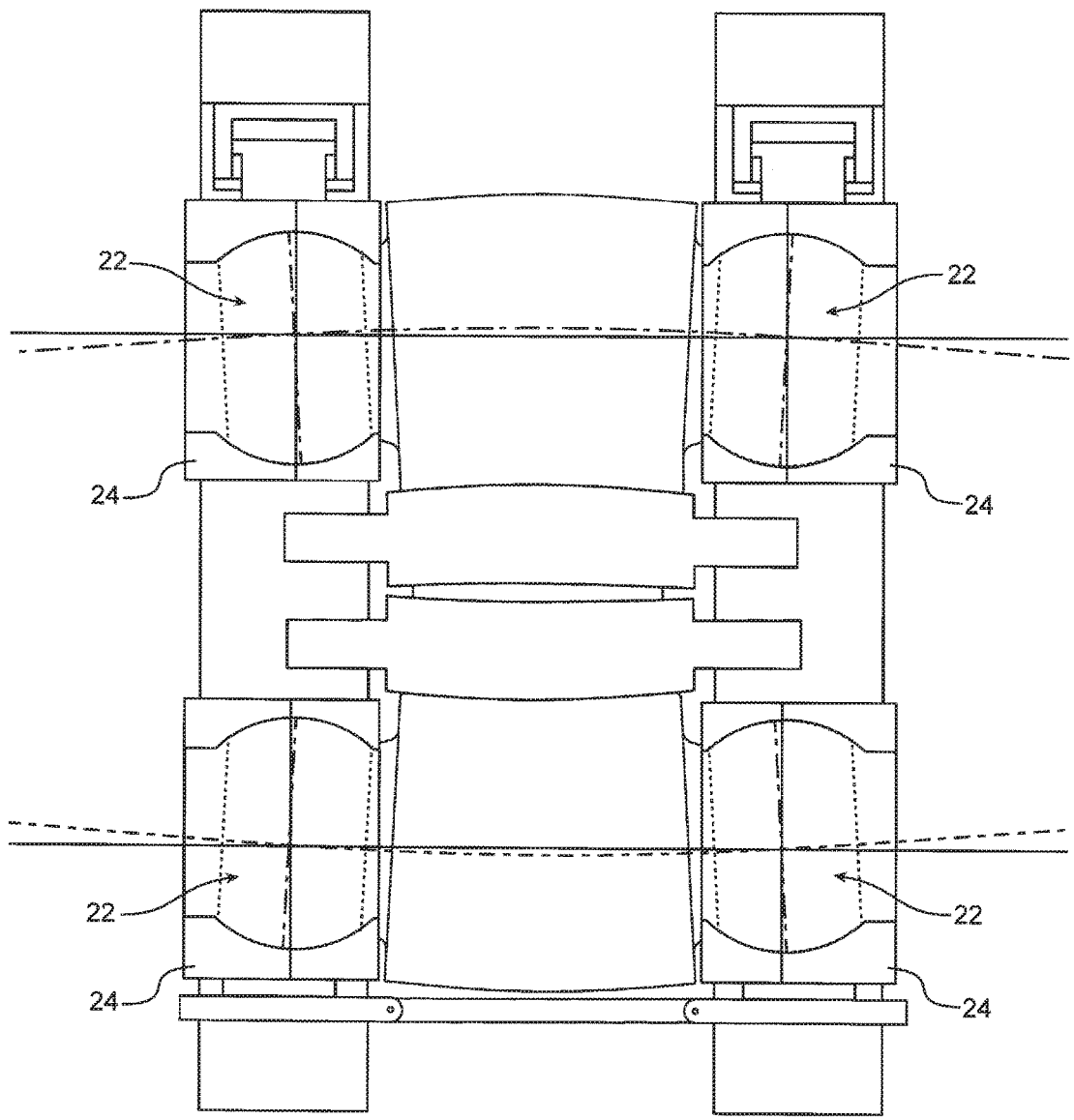
FIG. 2 is a diagrammatic illustration of a roll stand equipped with spherical oil film bearings in accordance with exemplary embodiments of the present invention.
Figures 3, 4:
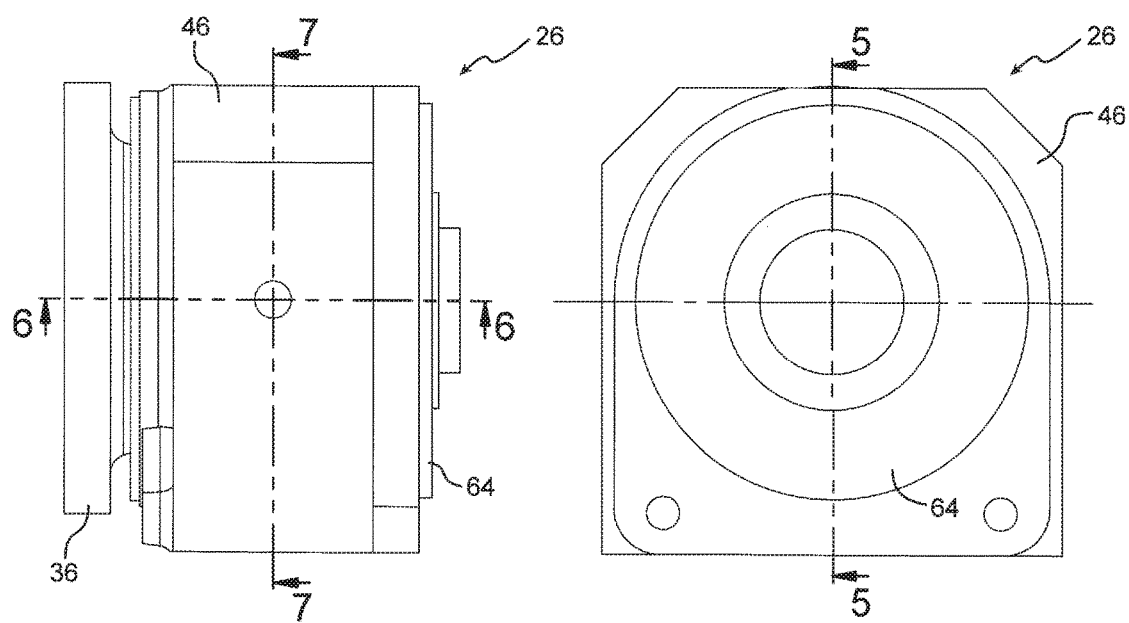
FIG. 3 is a side view of a spherical oil film bearing in accordance with an exemplary embodiment of the present invention.
FIG. 4 is an end view of the spherical oil film bearing depicted in FIG. 3.

With reference initially to FIGS. 3-7, a spherical bearing in accordance with an exemplary embodiment of the present invention is generally depicted at 26. Bearing 26 comprises a sleeve 28 having an internal bore 30 and an external spherical surface 32. The internal bore 30 is tapered and configured and dimensioned for axial insertion onto the tapered neck 34 of a roll 36.

A bushing 38 has an internal spherical surface 40 configured and dimensioned to surround and rotatably contain the external spherical surface 32 of the sleeve 28.

Figure 8:
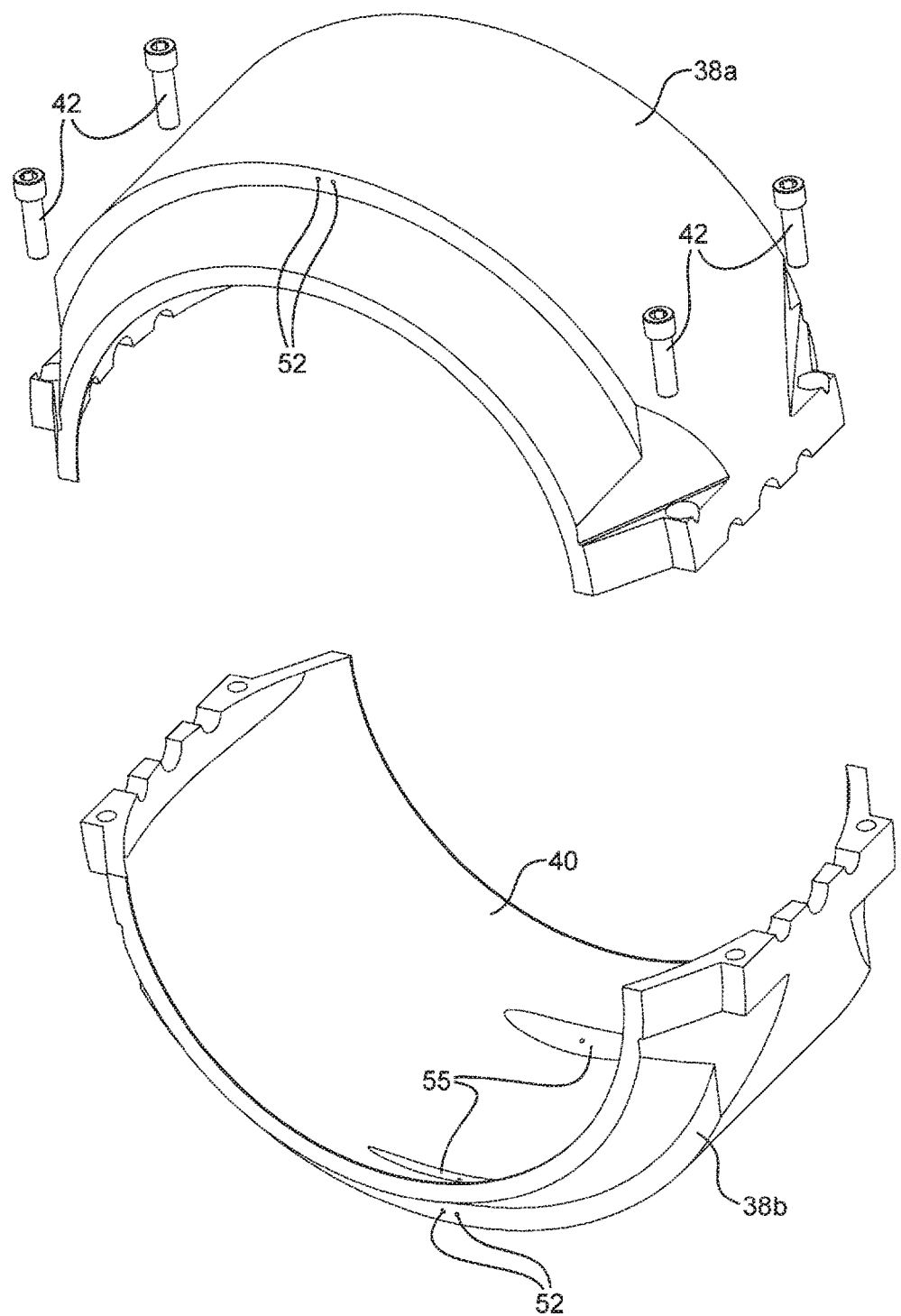
FIG. 8 is an exploded perspective view of the multiple segments making up the bushing shown in FIGS. 5-7.

With reference to FIG. 8, it will be seen that the bushing 38 is subdivided into multiple segments with only two half segments 38a, 38b being preferred.

Figure 9:
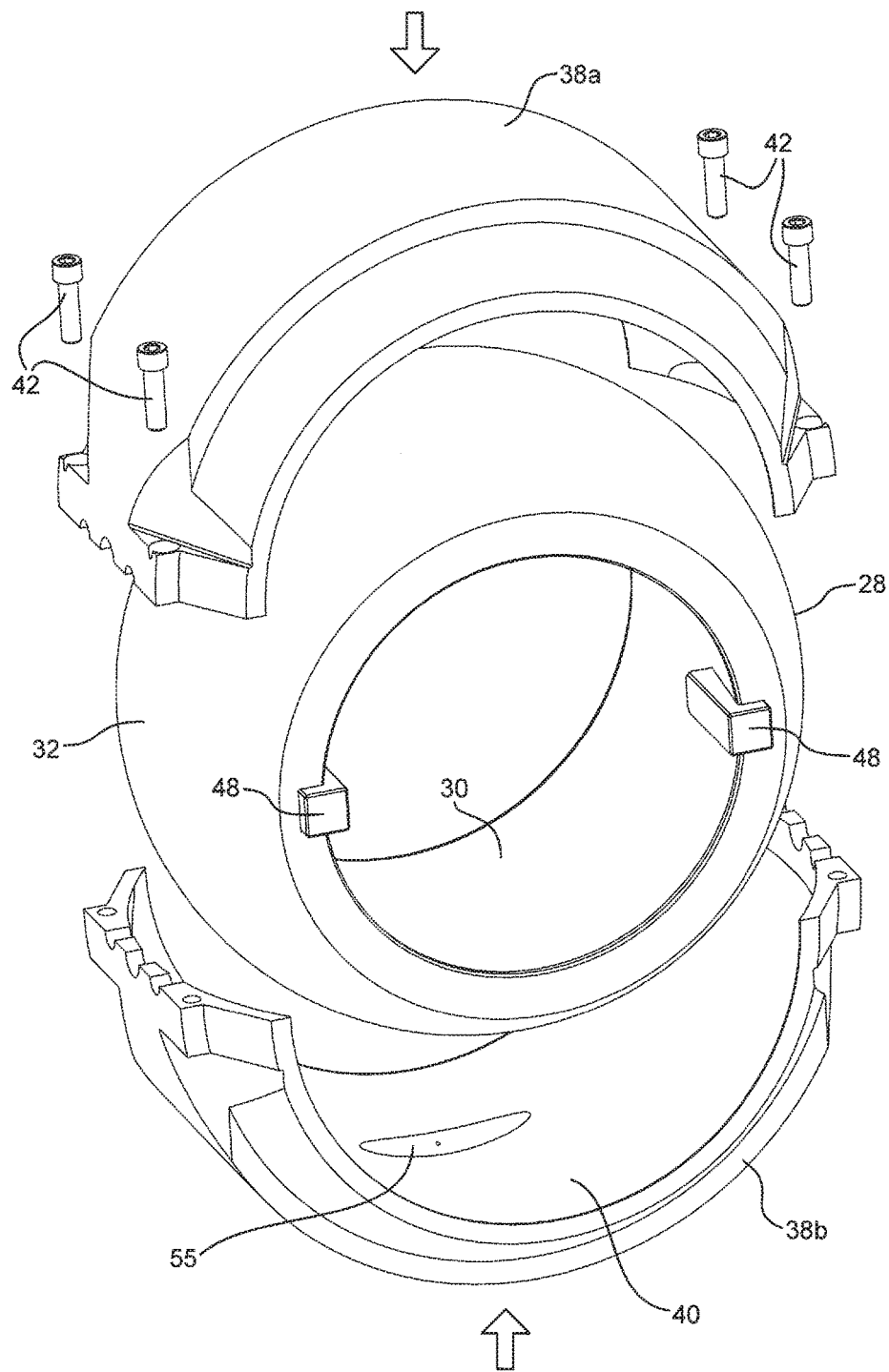
FIG. 9 shows the exploded bushing segments prior to their assembly around the spherical sleeve.
Figure 10:
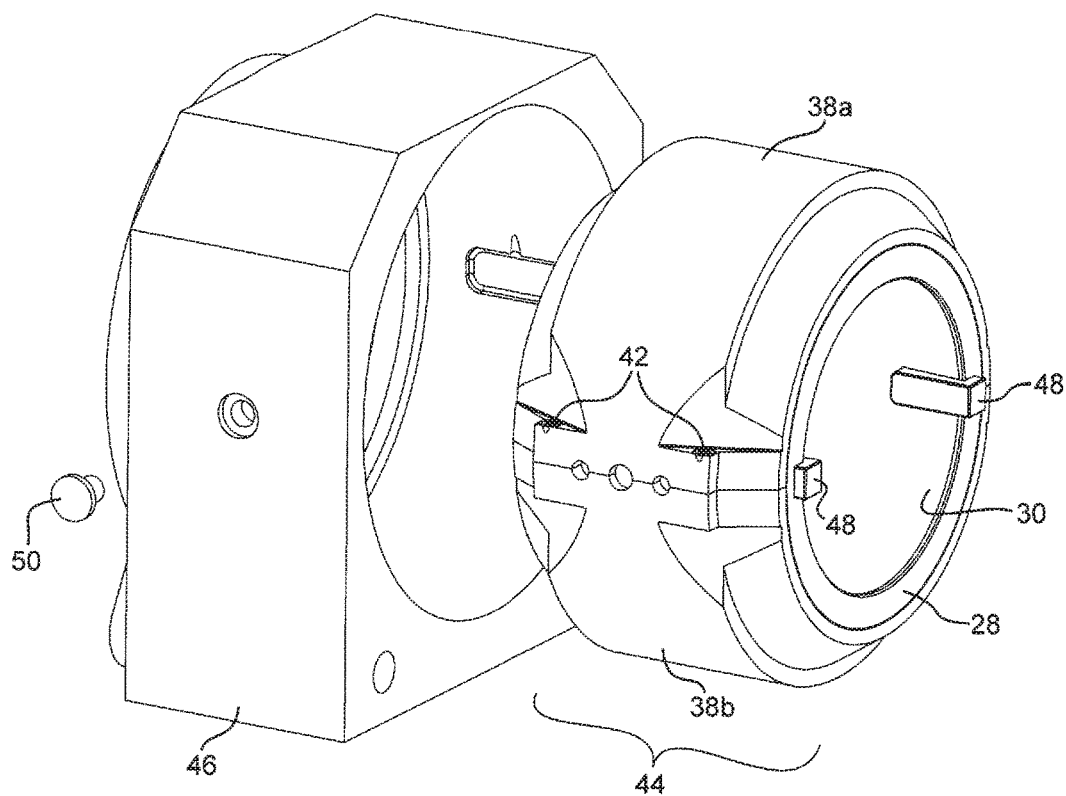
FIG. 10 shows the bushing segments assembled around the spherical sleeve, with the bushing segments being interconnected and cooperating with the spherical sleeve to comprise an integral assembly receivable as a unit in the chock.

With additional reference to FIG. 9, it will be seen that the two bushing half segments 38a, 38b are configured and arranged to be brought together around the sleeve 28 in the direction of the diagrammatic arrows, and to be interconnected as shown in FIG. 10 by tensioned bolts 42. Although bolts 42 are shown, any other like tensioned fasteners may be employed to draw the bushing segments together around the sleeve.

As shown in FIG. 10, the thus interconnected bushing segments 38a, 38b and sleeve 28 comprise an integral assembly 44 receivable as a unit in a chock 46.

The internal spherical surface 40 of the bushing 38 is substantially continuous, meaning 20 that it is uninterrupted except for passages, recesses and grooves serving to supply liquid lubricant to the interface between the spherical surfaces 32, 40, and any seams at the abutting edges of the bushing segments.

Figure 6:
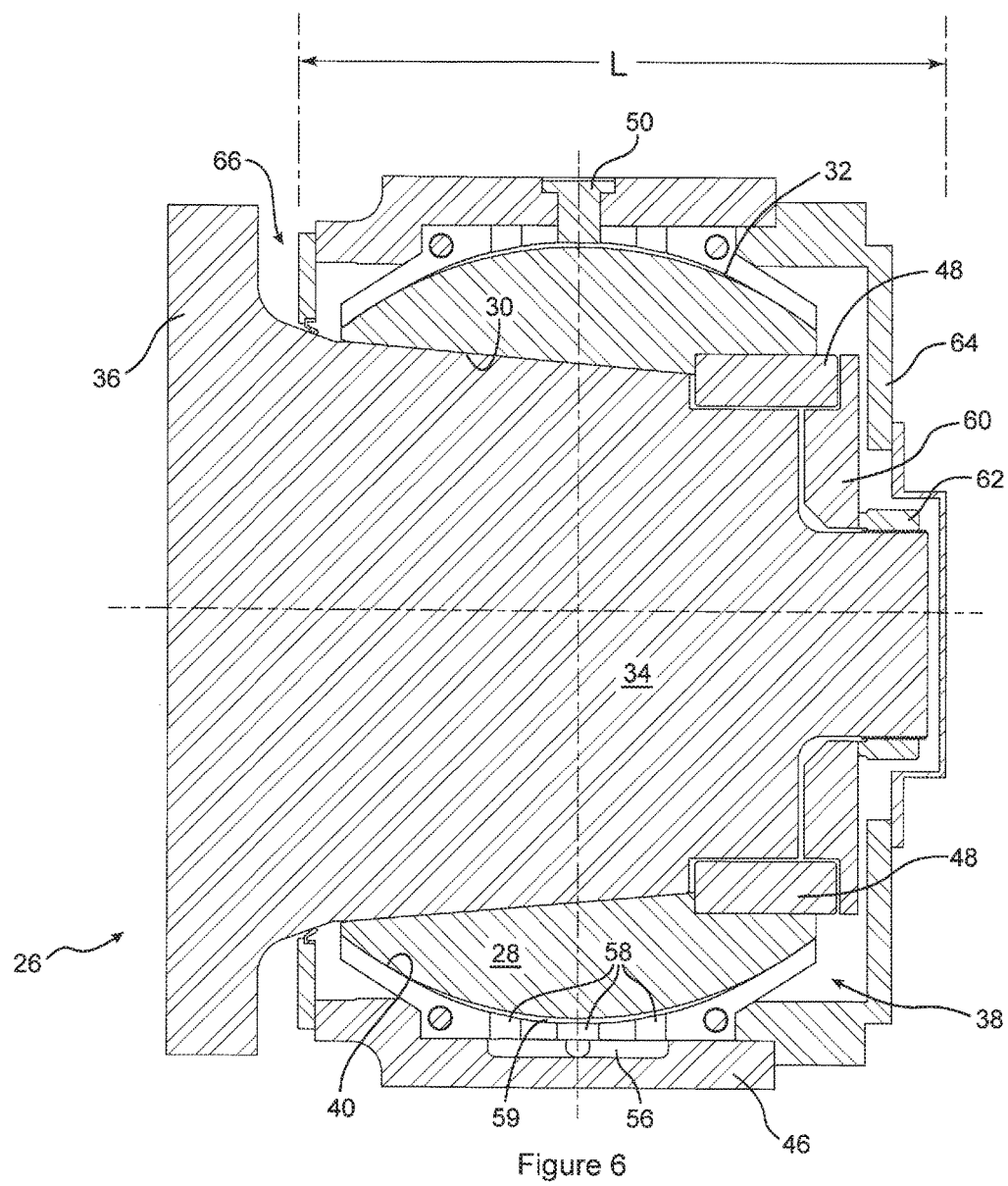
FIG. 6 is a horizontal cross-sectional view taken along line 6-6 of FIG. 3.
Figure 7:
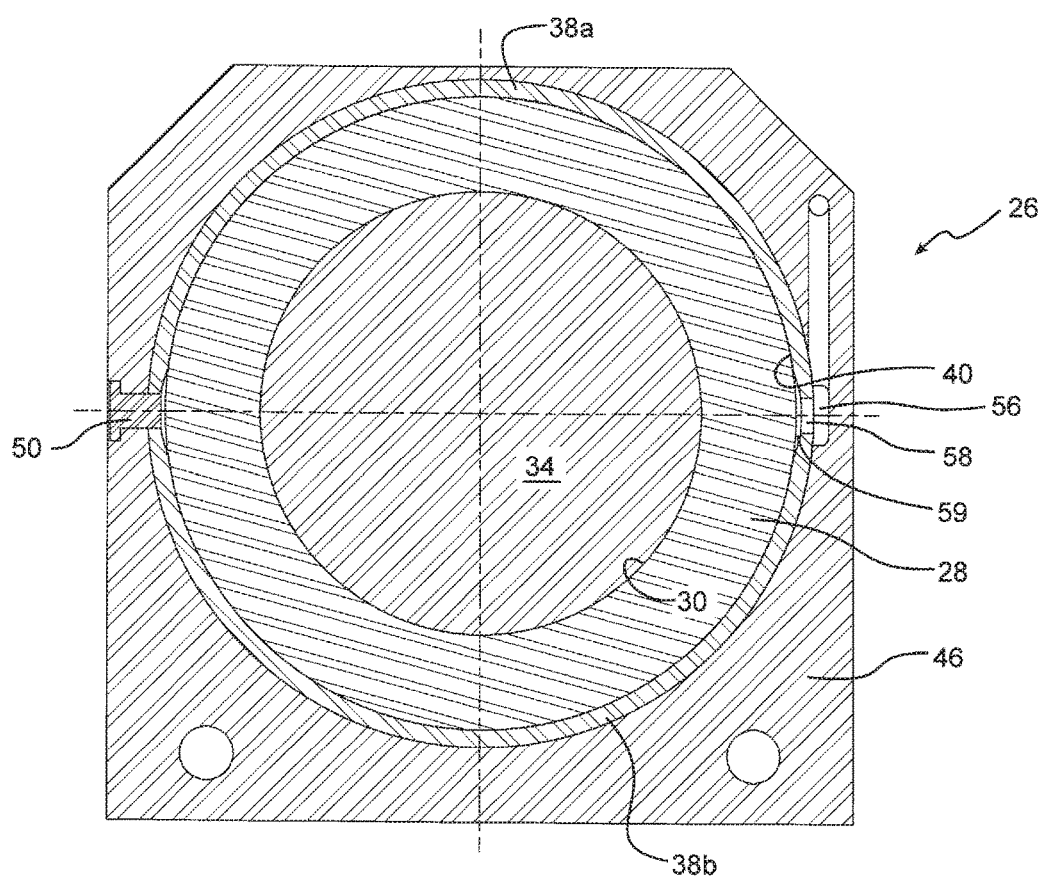
FIG. 7 is a vertical cross-sectional view taken along line 7-7 of FIG. 3.

As shown in FIG. 6, the sleeve may be rotatably fixed to the roll neck 34 by keys 48, and the bushing 38 may be rotatably fixed within the chock 46 by a pin 50 or other like connector. The thickness of the sleeve 28 is such that the keys 48 may extend into the bearing load zone Z without adversely affecting rolling accuracy. This beneficially shortens the overall length L of the bearing.

With additional reference to FIG. 6, a network of passages 56, 58 in the chock 46 and bushing 38 may serve as a means for supplying low pressure liquid lubricant via elliptical rebored recesses 59 to the interface between the external and internal spherical surfaces 32, 40 of the bearing. The recesses 59 are located outside of the bearing load zone.

Figure 11:
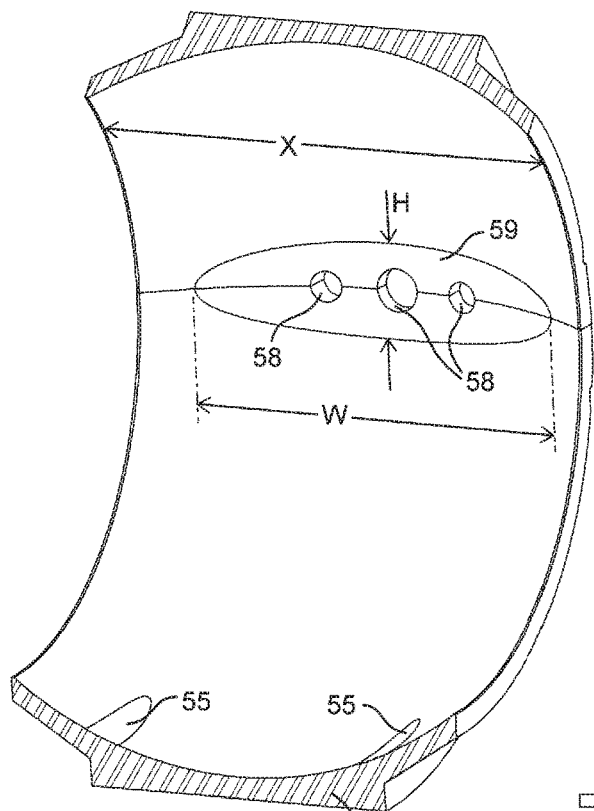
FIG. 11 is a partial internal view of the mating bushing segments.

With reference to FIG. 11, it will be seen that the elliptical rebored recesses 59 have heights "H" and widths "W", and are bisected by the seam between the two bushing halves 38a, 38b. In order to maximize effective lubricant delivery, the pad widths W should be between 70 to 90% of the bushing lengths "X", with 80% being preferable, and the pad heights H should be between 20% to 30% of the pad widths W, with 25% being preferable.

Recesses with different shapes dimensions outside of these ranges are considered likely to reduce lubrication efficiency.

Figure 5:
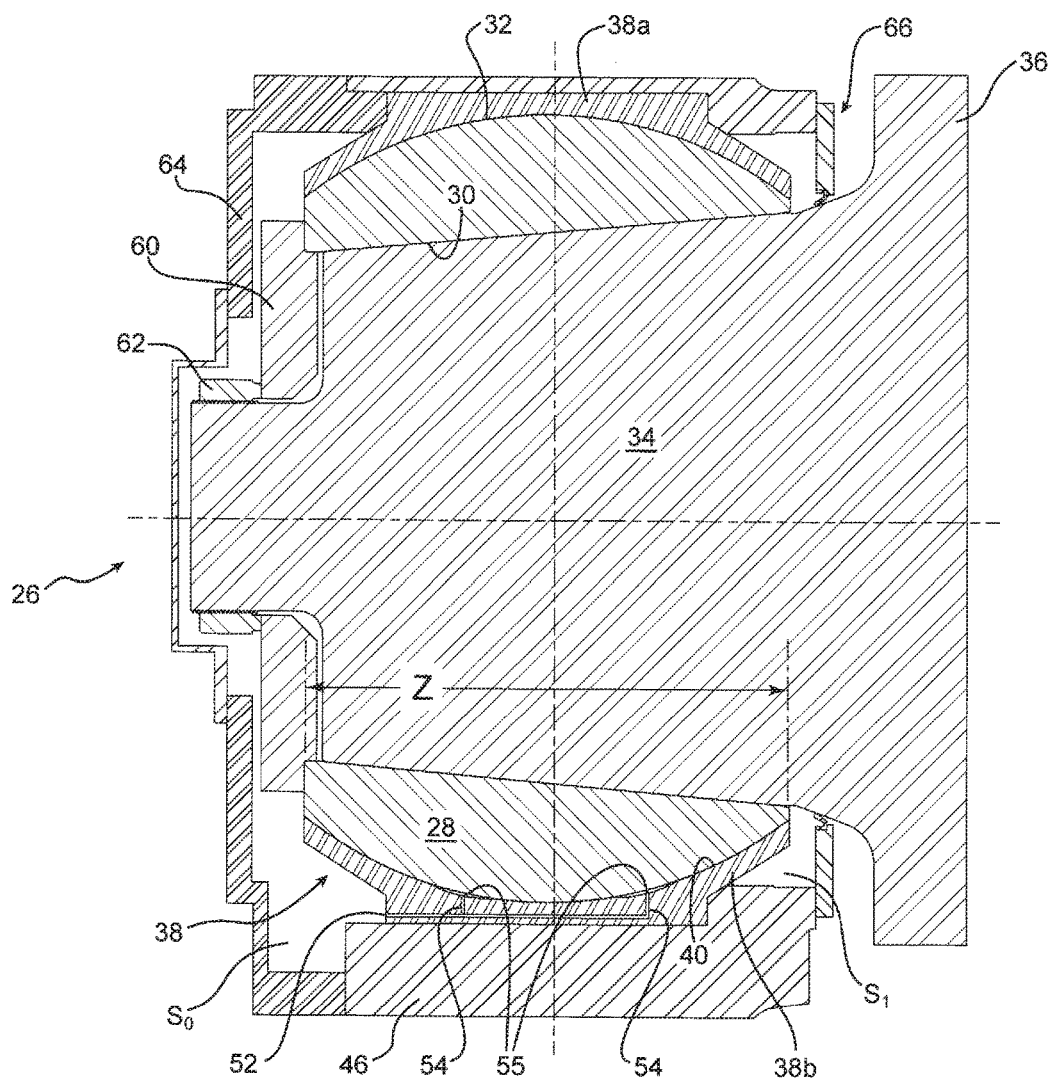
FIG. 5 is a longitudinal vertical sectional view taken along line 5-5 of FIG. 4.

As shown in FIGS. 5 and 8, additional passages 52, 54 may be provided to admit high pressure lubricant via elliptical rebored recesses 55 to the interface between the external and internal bearing surfaces 32, 40 at the bearing load zone Z.

Figure 12:
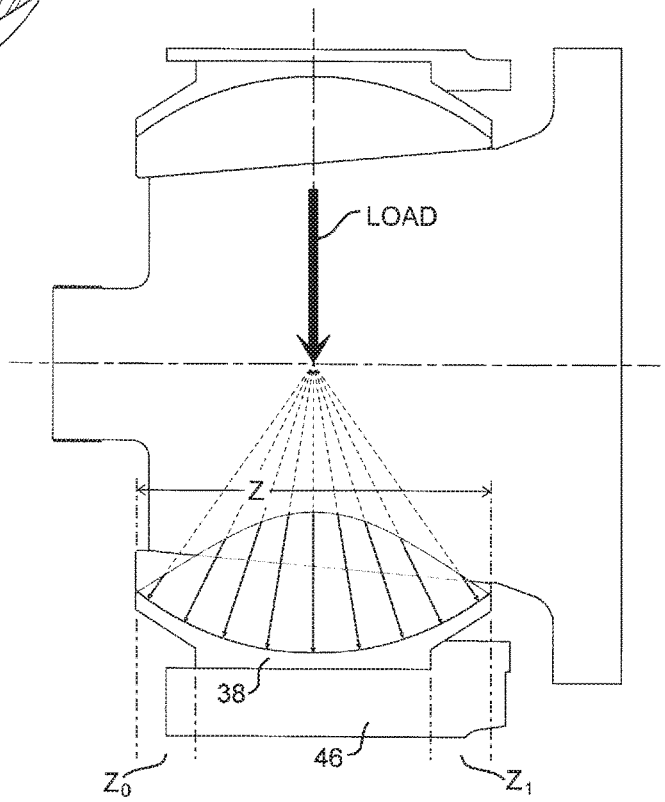
FIG. 12 is a diagrammatic illustration of the pressure profile at the bearing load zone.

With reference to FIG. 12, it will be seen that when the bearing is subjected to a load, the pressure profile of the hydrodynamically maintained lubricant film in the bearing load zone Z is maximized at the bushing center, and gradually diminishes in opposite directions from the center towards the inboard and outboard ends. Because of the lower pressures at the inboard and outboard ends, at the inboard and outboard end portions $Z_1$, $Z_0$ of the load zone, the bushing may be spaced from and need not be supported radially by the chock 46. As a result, as shown in FIG. 5, end clearances between the bushing and chock beneficially accommodate generously dimensioned inboard and outboard sumps $S_1$, $S_0$ for receipt of lubricant escaping from opposite ends of the bushing/sleeve interface. This further contributes to an overall shortening of the bearing length.

The bearing 26 may be held in place on the roll neck 34 by a retaining ring 60 and a collar 62 threaded onto the end of the roll neck. A cover 64 will typically enclose the outboard end of the bearing. A seal assembly 66 at the inboard end of the bearing may serve to retain lubricant in the bearing while preventing penetration of the external contaminants, e.g., cooling water, mill scale, etc.

What is claimed is:

1. An oil film bearing for rotatably supporting a roll in a rolling mill, said bearing comprising:

a sleeve having an internal bore and an external spherical surface, said internal bore being configured and dimensioned for axial insertion onto a neck of said roll;

a bushing having an internal spherical surface configured and dimensioned to surround and rotatably contain the external spherical surface of said sleeve, said bushing being subdivided into multiple interconnected segments;

a chock for containing and radially supporting said interconnected bushing segments, the bushing segments and sleeve form an integral assembly receivable as a unit in the chock;

a pin that rotatably fixes said bushing in said chock;

means for supplying liquid lubricant between said internal surface and external surface that includes a network of passages in said chock and bushing communicating with elliptically rebored first recesses in said internal spherical surface at a location outside of a load zone of the bearing; and an inboard end and an outboard end of said bushing segments being spaced from and thus not radially supported by said chock.

2. The oil film bearing of claim 1 wherein said bushing is subdivided into two segments.

3. The oil bearing of claim 1 wherein the internal spherical surface of said bushing is substantially continuous.

4. The oil film bearing of claim 1 wherein the segments of said bushing are interconnected by tensioned fasteners.

5. The oil film bearing of claim 1 wherein said means for supplying a liquid lubricant further comprises a second network of passages in said chock and bushing communicating with elliptically rebored second recesses in said internal spherical surface and within said load zone.

6. The oil film bearing of claim 1 wherein said first recesses have a width between 70 to 90% of the bushing length.

7. The oil film bearing of claim 6 wherein said first recesses have a width equal to 80% of the bushing length.

8. The oil film bearing of claim 1 wherein said first pads recesses have a height between 20 to 30% of its widths.

9. The oil film bearing of claim 8 wherein said recesses have a height equal to 25% of its widths.

10. An oil film bearing for rotatably supporting a roll in a rolling mill, said bearing comprising:
- a sleeve having an internal bore and an external spherical surface, said internal bore being configured and dimensioned for axial insertion onto a neck of said roll;
- a bushing having an internal spherical surface configured and dimensioned to surround and rotatably contain the external spherical surface of said sleeve, said bushing being subdivided into two interconnected segments;
- a chock for containing said sleeve surrounded by said interconnected bushing segments, said sleeve and said bushing segments comprising an integral assembly receivable as a unit in said chock;
- a pin that rotatably fixes said bushing in said chock;
- a means for supplying liquid lubricant between said internal surface and external surface that includes a network of passages in said chock and bushing communicating with elliptically rebored first recesses in said internal spherical surface at a location outside of a load zone of said bearing; and
- an inboard end and an outboard end of said bushing segments being spaced from and thus not radially supported by said chock.

11. An oil film bearing for rotatably supporting a roll in a rolling mill, said bearing comprising:
- a sleeve having an internal bore and an external spherical surface, said internal bore being configured and dimensioned for axial insertion onto a neck of said roll;
- a bushing having a substantially continuous internal spherical surface configured and dimensioned to surround and rotatably contain the external spherical surface of said sleeve, said bushing being subdivided into multiple segments interconnected by tensioned fasteners;
- a chock for containing said sleeve surrounded by said interconnected bushing segments, the bushing segments and sleeve form an integral assembly receivable as unit in the chock;
- a pin that rotatably fixes said bushing in said chock;
- means for supplying liquid lubricant between said internal surface and external surface that includes a network of passages in said chock and bushing communicating with elliptically rebored first recesses in said internal spherical surface at a location outside of a load zone of the bearing; and
- an inboard end and an outboard end of said bushing segments being spaced from and thus not radially supported by said chock.

12. An oil film bearing for rotatably supporting a roll in a rolling mill, said bearing comprising:
- a sleeve having an internal bore and external spherical surface, said internal bore being configured and dimensioned for axial insertion onto a neck of said roll;
- a bushing having an internal spherical surface configured and dimensioned to surround and rotatably contain the external spherical surface of said sleeve, said bushing being subdivided into multiple interconnected segments;
- a chock for containing said sleeve surrounded by said interconnected bushing segments, the bushing segments and sleeve form an integral assembly receivable as unit in the chock;
- a pin that rotatably fixes said bushing in said chock;
- means for supplying liquid lubricant to the interface between said external and internal spherical surfaces, said means comprising a network of passages in said chock and bushing communicating with elliptically bored recesses in said internal spherical surface at a location outside of the load zone of the bearing; and
- an inboard end and an outboard end of said bushing segments being spaced from and thus not radially supported by said chock.

13. An oil film bearing for rotatably supporting a roll in a rolling mill, said bearing comprising:
- a sleeve having an internal bore and external spherical surface, said internal bore being configured and dimensioned for axial insertion onto a neck of said roll;
- a bushing having an internal spherical surface configured and dimensioned to surround and rotatably contain the external spherical surface of said sleeve, said bushing being subdivided into two interconnected segments;
- a chock for containing said sleeve surrounded by said interconnected bushing segments, said sleeve and said bushing segments comprising an integral assembly receivable unit in said chock, with an inboard end and an outboard end of said bushing segments being spaced from and thus not radially supported by said chock;
- a pin that rotatably fixes said bushing in said chock; and
- means for supplying liquid lubricant between said internal surface and external surface that includes a network of passages in said chock and bushing communicating with elliptically rebored first recesses in said internal spherical surface at a location outside of a load zone of the bearing.

* * * * *